US008063945B2

(12) United States Patent
Hoshino

(10) Patent No.: US 8,063,945 B2
(45) Date of Patent: Nov. 22, 2011

(54) CAMERA APPARATUS, WHICH CONTROLS A DISPLACEMENT AND SIZE OF A FRAME REGION IN A CAPTURED SUBJECT IMAGE, RECORDING MEDIUM IN WHICH A CAMERA APPARATUS CONTROL PROGRAM IS RECORDED, AND METHOD FOR CONTROLLING THE CAMERA APPARATUS

(75) Inventor: Hiroyuki Hoshino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 673 days.

(21) Appl. No.: 12/041,736

(22) Filed: Mar. 4, 2008

(65) Prior Publication Data

US 2008/0218596 A1 Sep. 11, 2008

(30) Foreign Application Priority Data

Mar. 7, 2007 (JP) ................................ 2007-056682

(51) Int. Cl.
*H04N 5/228* (2006.01)
(52) U.S. Cl. ................ 348/222.1; 348/333.03
(58) Field of Classification Search .......... 348/169–172, 348/552, 345–347, 152, 154, 155, 157, 333.02, 348/333.03, 333.04; 352/140; 358/906; 396/79, 82, 89
See application file for complete search history.

(56) References Cited

U.S. PATENT DOCUMENTS

| 5,552,823 | A | * | 9/1996 | Kageyama | .................... 348/155 |
| 6,993,158 | B2 | | 1/2006 | Cho et al. | |
| 2003/0103145 | A1 | * | 6/2003 | Ejima et al. | ................. 348/207.2 |
| 2005/0162540 | A1 | * | 7/2005 | Yata | .............................. 348/345 |

FOREIGN PATENT DOCUMENTS

| CN | 1402551 A | 3/2003 |
| JP | 5-161053 A | 6/1993 |
| JP | 8-249450 A | 9/1996 |
| JP | 10-126766 A | 5/1998 |
| JP | 2001-094919 A | 4/2001 |
| JP | 2002-314851 A | 10/2002 |
| JP | 3750499 B2 | 12/2005 |

OTHER PUBLICATIONS

Machine English Translation of JP 2002-033949 A, Akazawa, Jan. 31, 2002.*
Chinese Office Action dated Aug. 28, 2009 and English translation thereof issued in a counterpart Chinese Application No. 200810100351.4.
Korean Office Action dated Mar. 30, 2009 (3 pages), and English translation thereof (3 pages), issued in counterpart Korean Application Serial No. 10-2008-0021050.
Japanese Office Action dated Apr. 19, 2011 (and English translation thereof) in counterpart Japanese Application No. 2007-056682.

* cited by examiner

*Primary Examiner* — Nelson D. Hernández Hernández
(74) *Attorney, Agent, or Firm* — Holtz, Holtz, Goodman & Chick, PC

(57) ABSTRACT

A through image with a trace frame is displayed. A subject on which a trace frame is superposed when a shutter key is half-depressed is determined as a target image. A trimming frame is additionally displayed. Whether the target image has moved within the through image or not is determined. When the target image has moved within the through image, the trace frame and the trimming frame are displayed so as to follow the target image. Then, whether the center vector of the trimming frame≈four surrounding vectors is established or not is determined. When this determination results in YES, it is assumed that the target image is larger than the trimming frame and the trimming frame is enlarged by a predetermined amount.

14 Claims, 12 Drawing Sheets

42 TRACE FRAME  43 TARGET IMAGE 42  44  43

44

42  44

43  44

SUBJECT LOST 44  45

CAMERA APPARATUS, WHICH CONTROLS A DISPLACEMENT AND SIZE OF A FRAME REGION IN A CAPTURED SUBJECT IMAGE, RECORDING MEDIUM IN WHICH A CAMERA APPARATUS CONTROL PROGRAM IS RECORDED, AND METHOD FOR CONTROLLING THE CAMERA APPARATUS

BACKGROUND OF THE INVENTION

1. Field of the Invention

The present invention relates to a camera apparatus having a so-called auto-framing function, a recording medium in which a camera apparatus control program is recorded, and a method for controlling the camera apparatus.

2. Description of the Related Art

Cameras having the so-called auto-framing function have been put into a practical use. This camera displays a through image and displays a trimming frame showing an image-capture range on the through image. This camera also detects the motion of a target image (target subject) in the through image and changes, in accordance with the motion of this detected motion, a position at which a trimming frame is displayed. When a photographing instruction is given, the camera cuts the image in the trimming frame to record the image. This allows, even when the target image moves, the trimming image accommodating the target image to be imaged and recorded (e.g., see Japanese Patent No. 3750499).

However, in the above-described auto-framing function, the position at which the trimming frame is displayed is controlled in accordance with the motion of the target image in the through image (i.e., the motion vector of the target image on a two-dimensional coordinate). Thus, when the subject as the target image moves in a front-and-rear direction, the trimming frame cannot be proportionally controlled. This may cause a case where the subject approaches the camera to cause the target image in the through image to be larger than the trimming frame, thus preventing the trimming image accommodating a desired subject from being imaged or recorded.

This problem of a mismatch between a target image and a frame is not limited to the trimming frame showing an imaging/recording range. This problem is also caused in an Auto Focus (AF) measurement frame showing the range in which the brightness of a subject subjected to Automatic Exposure (AE) is measured and an AF measurement frame showing a range in which the contrast of a subject subjected to AF is measured.

SUMMARY OF THE INVENTION

One embodiment of the present invention is characterized in: a camera apparatus. The camera apparatus includes: an imaging section that sequentially images a subject image; a setting section that sets a frame that surrounds a target image in the subject image imaged by the imaging section to show a range within which predetermined photographing processing is carried out; a first control section that changes a position of the frame set by the setting section so as to follow a change in a position of the target image; a detection section that detects a size of the target image based on the subject image imaged by the imaging section; and a second control section that changes a size of the frame so as to follow a change in the size of the target image detected by the detection section.

Another embodiment of the present invention is characterized in: a recording medium storing a camera apparatus control program. This recording medium causes a camera apparatus to function as: an imaging section that sequentially images a subject image; a setting section that sets a frame that surrounds a target image in the subject image imaged by the imaging section to show a photographing range; a first control section that changes a position of the frame set by the setting section so as to follow a change in a position of the target image; a detection section that detects a size of the target image based on the subject image imaged by the imaging section; and a second control section that changes a size of the frame so as to follow a change in the size of the target image detected by the detection section.

Another embodiment of the present invention is characterized in a method for controlling a camera apparatus that includes: an imaging step of causing the camera apparatus to sequentially image a subject image; a setting step of setting a frame that surrounds a target image in the subject image imaged by the imaging section to show a range within which a predetermined photographing processing is performed; a control step of changing a position of the frame set by the setting step so as to follow a change in a position of the target image; a detection step of detecting a size of the target image based on the subject image imaged by the imaging step; and a control step of changing a size of the frame so as to follow a change in the size of the target image detected by the detection step.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Hereinafter, embodiments of the present invention will be described with reference to the drawings.

First Embodiment

Figure 1:
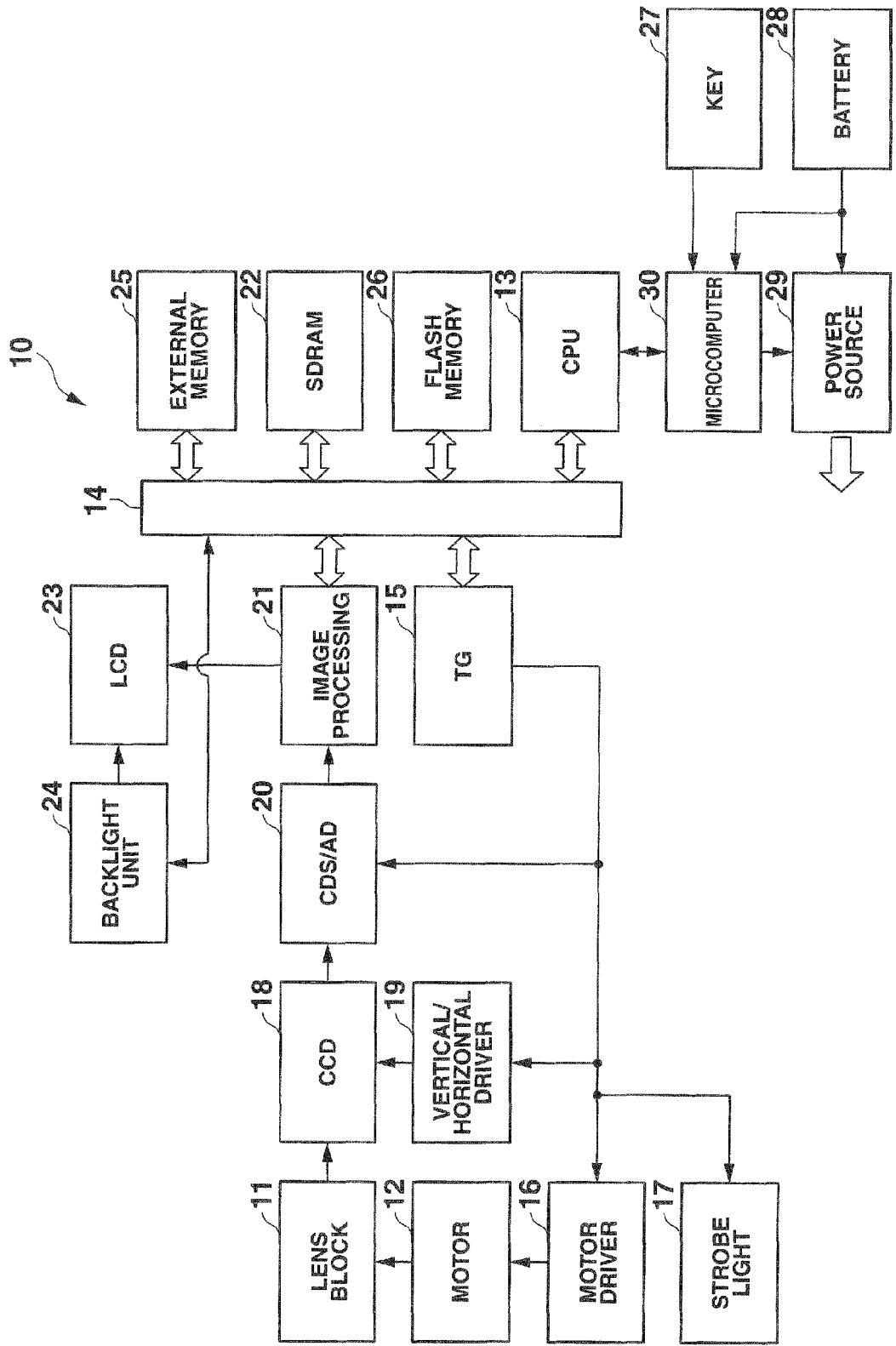
FIG. 1 is a block diagram illustrating a circuit configuration of a digital camera according to one embodiment of the present invention.

FIG. 1 is a block diagram illustrating a circuit configuration of a digital camera 10 common in the respective embodiments of the present invention. This digital camera 10 has general functions (e.g., Auto Focus (AF) function. Automatic Exposure (AE), Auto White Balance (AWB)). Thus, a lens block 11 includes an optical system (e.g., zoom lens, focus lens) and a driving mechanism for driving the optical system. The optical system is driven in an optical axis direction by a motor 12 provided in the driving mechanism. It is noted that this embodiment uses a contrast detection method in which the AF detects an AF evaluation value (contrast value) of an image imaged at each position while moving a focus lens in the optical axis direction to assume the peak position of the AF evaluation value as a focusing position.

A Central Processing Unit (CPU) 13 for controlling the entirety of the digital camera 10 is connected with a motor driver 16 via a bus 14 and a timing generator (TG) 15. The motor driver 16 drives the motor 12 based on a timing signal generated by the timing generator 15 in accordance with the instruction from the CPU 13. Strobe light 17 is also driven by the timing signal generated by the timing generator 15.

This digital camera 10 also includes a Charge Coupled Device (CCD) 18 as an imaging element. The CCD 18 is placed on the optical axis of the lens block 11 and an image of a subject is formed on an acceptance surface of the CCD 18 by the lens block 11. The CCD 18 is driven by a vertical/horizontal driver 19 based on a timing signal generated by the timing generator 15 based on the instruction from the CPU 13 and outputs an analog imaging signal depending on an optical image of the subject to a unit circuit 20. The unit circuit 20 is composed of a Correlated Double Sampling (CDS) circuit that removes noise included in an output signal from the CCD 18 using a correlated double sampling and an A/D converter that converts an imaging signal from which the noise is removed to a digital signal for example. The unit circuit 20 outputs the digitally-converted imaging signal to an image processor 21.

Upon receiving the inputted imaging signal, the image processor 21 subjects the imaging signal to a processing such as a pedestal clamp to convert the signal to a luminance (Y) signal and a color difference (UV) signal and to subject the signal to a digital signal processing for improving the image quality (e.g., auto white balance, edge enhancement, pixel interpolation). The YUV data converted by the image processor 21 is sequentially stored in a Synchronous Dynamic Random Access Memory (SDRAM) 22 and is converted, in a REC through mode, to a video signal whenever data for one frame (image data) is accumulated. The resultant video signal is sent to a liquid crystal monitor (LCD) 23 including a backlight unit 24 (which will be described later) and is displayed as a through image on a screen.

The CPU 13 is triggered by an operation of a shutter key to switch the CCD 18, the vertical/horizontal driver 19, the unit circuit 20, and the image processor 21 from a through image photographing mode (REC through mode) to a still image photographing mode. Image data that is obtained by a photographing processing by this still image photographing mode and that is temporarily stored in a SDRAM 22 is compressed by the CPU 13 and is finally recorded in an external memory 25 as a still image file having a predetermined format. The still image file recorded in the external memory 25 is read and stretched by the CPU 13 in a PLAY mode in accordance with a selection operation by a user and is developed as YUV data by the SDRAM 22 and is subsequently displayed on a liquid crystal monitor 23.

A flash memory 26 stores therein various programs for causing the CPU 13 to control the respective sections (e.g., a program for controlling AE, AF, and AWB, a program for causing the CPU 13 to function as the first and second display control section and a detection section of the present invention for example).

The digital camera 10 has: a key input section 27 including a plurality of operation keys and switches (e.g., a power source switch, a mode selection key, a shutter key, a zoom key); a chargeable battery 28 such as a nickel hydride battery; a power source control circuit 29 for supplying the power of this battery 28 to the respective sections; and a microcomputer 30 for controlling these sections. The microcomputer 30 steadily scans the operation of an operation key through the key input section 27. When an operation key is operated by a user, the microcomputer 30 sends to the CPU 13 an operation signal that depends on the contents of the operation. The shutter key has a so-called half shutter function providing a half depression and a full depression.

Figure 2:
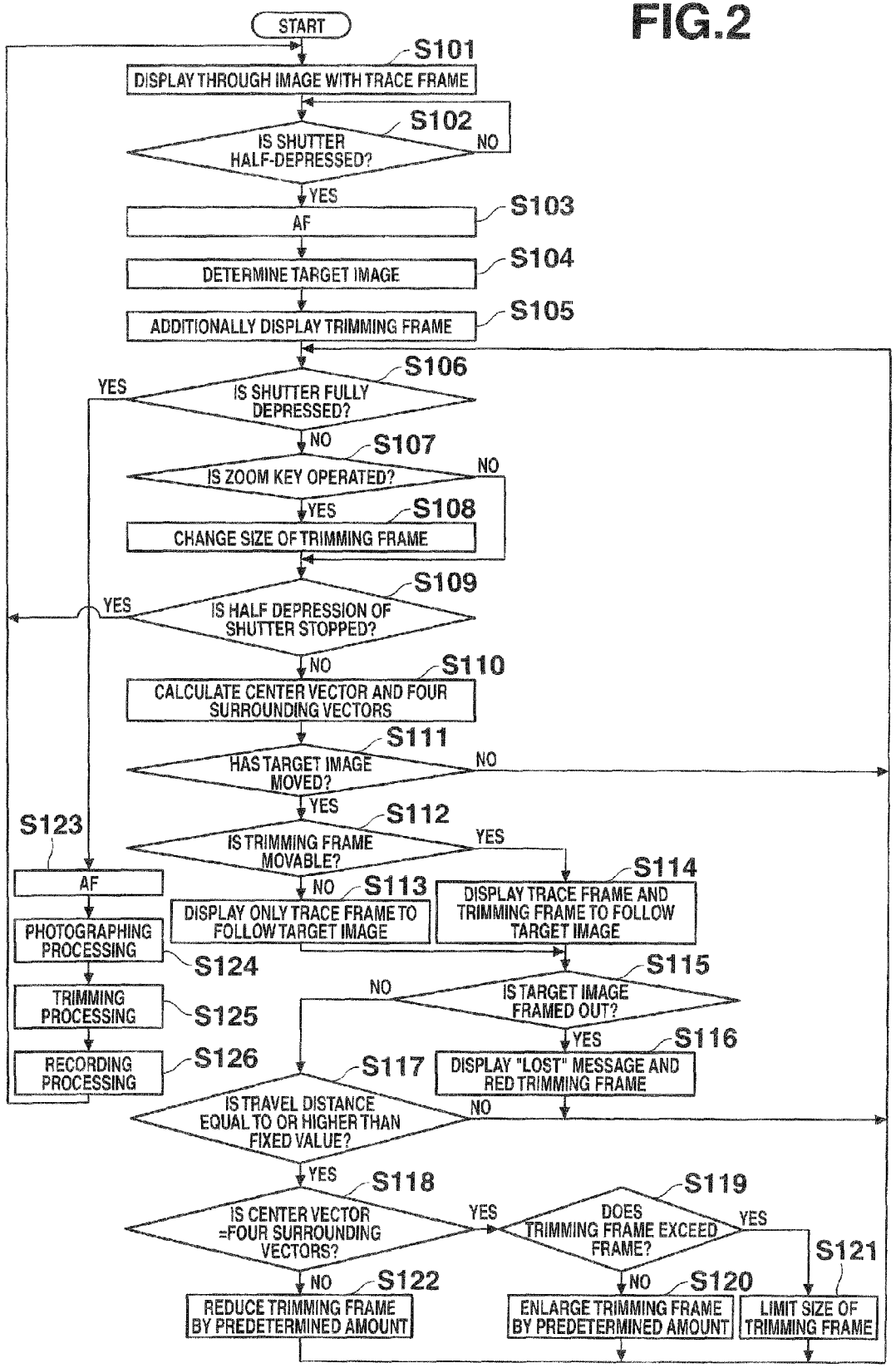
FIG. 2 is a flowchart illustrating a processing procedure of the first embodiment.
Figure 3A:
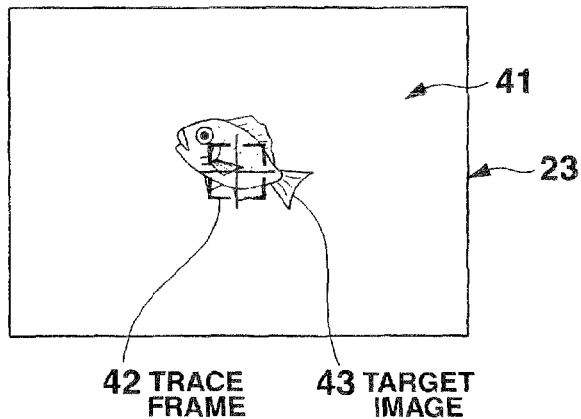
FIGS. 3A to 3F illustrate a display transition of the embodiment.

In this embodiment according to the structure as described above, when a user selects the mode selection key to set an auto-framing mode, the CPU 13 executes, based on a program stored in the flash memory 26, a processing shown in the flowchart of FIG. 2. First, the CPU 13 causes the liquid crystal monitor 23 to start the display of a through image with a trace frame (Step S101) so as to display the trace frame 42 at the center. The processing in Step S101 causes, as shown in FIG. 3A, the liquid crystal monitor 23 to display a through image 41 and to display the trace frame 42 at the center.

Next, a half depression operation of the shutter key is waited (Step S102) during which the user adjusts the angle of the digital camera 10 so that the trace frame 42 is matched with a desired subject in the through image 41 to be photographed (i.e., so that the center of the trace frame 42 is at the center of the subject). If the trace frame 42 appropriately covers the desired subject, the user half-depresses the shutter key. As a result, Step S102 determines YES to proceed to Step S103 to execute an AF processing to control the lens block 11 so that an image region corresponding to the trace frame 42 is focused (Step S103).

Figure 3B:
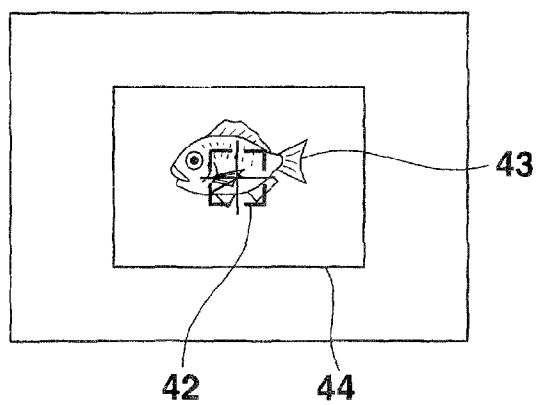

The subject on which the trace frame 42 is superposed when the shutter key is half-depressed is determined as a target image 43 (Step S104). Thus, when the shutter key is half-depressed in the state shown in FIG. 3A, a fish as the subject on which the trace frame 42 is superposed is determined as the target image 43. As in a processing for following the target image 43 (subject) in Step S113 (which will be described later), a positional relationship between the target image 43 (subject) and the trace frame 42 is maintained at this point of time and the trace frame 42 follows the target image 43 (subject). Then, a trimming frame 44 is additionally displayed (Step S105). As shown in FIG. 3B, the processing in Step S105 additionally displays the trimming frame 44 consisting of a rectangular frame so that the trace frame 42 positioned at the center is surrounded by the trimming frame 44.

Figure 3C:
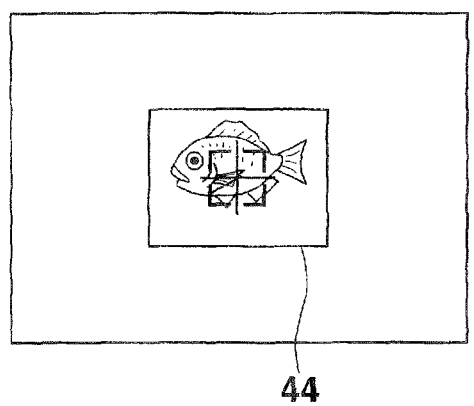

Next, whether the shutter key is fully-depressed or not is determined (Step S106). When the shutter key is not fully-depressed (Step S106: NO), then whether a zoom key is operated or not is determined (Step S107). When the zoom key is operated (Step S107: YES), the trimming frame 44 is enlarged or reduced in accordance with a direction along which the zoom key is operated to display the changed frame size (Step S108). Thus, when the zoom key is operated in the reducing direction, the processing in Step S108 displays the reduced trimming frame 44 as shown in FIG. 3C. When the zoom key is not operated, the trimming frame 44 of a default size shown in FIG. 3B is continuously displayed. It is noted that FIGS. 3D, 3E, and 3F described below show a case where the zoom key is not operated and the trimming frame 44 of the default size shown in FIG. 3B is directly used. Next, whether the half depression of the shutter key is stopped or not (Step S109) is determined. When the half depression of the shutter key is stopped (Step S109: YES), the processing returns to Step S101.

Figure 5A:
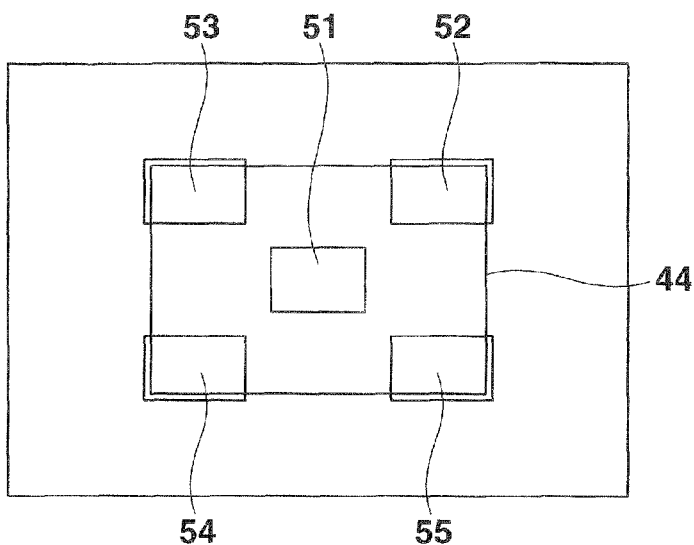
FIGS. 5A, 5B and 5C illustrate the contents of the processing of Step S110.

When the half depression of the shutter key is still continued (Step S109: NO), a center vector and four surrounding vectors are calculated (Step S110). The processing of Step S110 is carried out, as shown in FIG. 5A, by setting a center detection region 51 at the center of the trimming frame 44 and by setting the respective surrounding detection regions 52 to 55 that covers at the inner side and four corners of the trimming frame 44. In the respective regions 51 to 55, a block composed of a plurality of pixels for example is targeted and the motion vector of this target block is calculated. This provides the center vector calculated based on the center detection region 51 and the four surrounding vectors respectively calculated based on the surrounding detection regions 52 to 55.

Then, based on the calculated center vector, whether the target image 43 is moved in the through image or not is determined (Step S111). The expression of "the target image 43 is moved in the through image" section a case where the subject itself as the target image 43 is moved and a case where the user changes the angle of the digital camera 10 to cause a relative movement of the target image 43 in the through image.

Figure 3D:
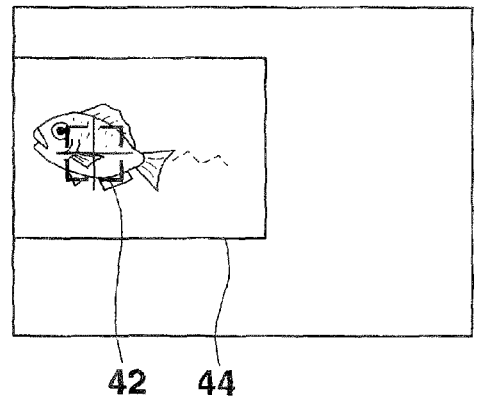

When Step S111 determines YES and the target image 43 is moved, whether the trimming frame 44 can be moved to follow the target image 43 or not is determined (Step S112). Specifically, as shown in FIG. 3D, when the trimming frame 44 is already moved to an end of the screen of the liquid crystal monitor 23, it is determined that the trimming frame 44 cannot be further moved to the left. In this case, the target image 43 is not followed by the trimming frame 44 and is followed only by the trace frame 42 and the target image 43 is displayed in a displaced manner (Step S113). In this way, even when the trimming frame 44 cannot be moved on the screen, the trace frame 42 is displaced to follow the target image 43.

Figure 3E:
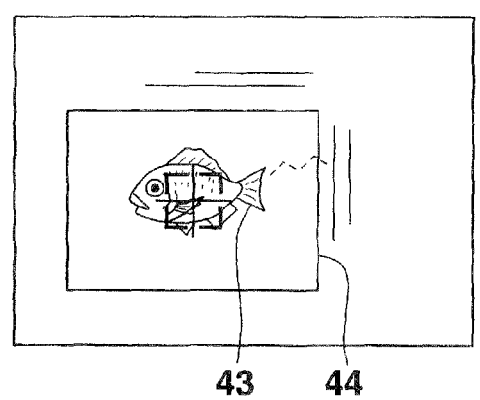
Figure 3F:
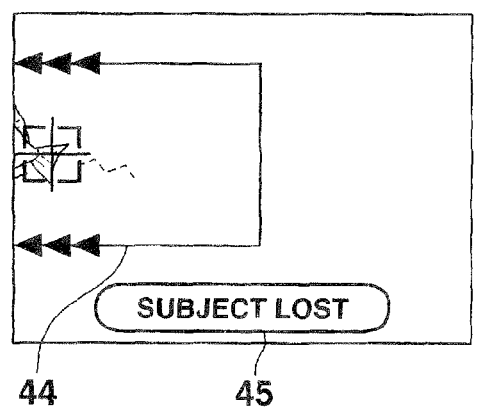

When Step S112 determines YES and the trimming frame 44 can be moved, the trace frame 42 and the trimming frame 44 are caused to follow the target image 43 to display the target image 43 in a displaced manner (Step S114). In other words, the target image 43 is displayed with the trace frame 42 and the trimming frame 44 moved in a direction shown by the center vector calculated in Step S110 with a travel distance shown by the center vector. Thus, when the target image 43 is moved obliquely in the left lower direction as shown in FIG. 3F, the target image 43 is displayed while the target image 43 displaced in the above direction by the travel distance, the trace frame 42 being superposed on the target image 43, and the trace frame 42 being positioned at the center of the trimming frame 44.

Next, whether the target image 43 is framed out or not is determined (Step S115). When the target image 43 is moved out of the screen of the liquid crystal monitor 23 and is framed out as shown in FIG. 3F (Step S115: YES), a message 45 of "subject lost" is displayed and the trimming frame 44 is displayed in red to change the display configuration of the trimming frame 44 (Step S116). It is noted that, even when the target image 43 is framed out, the processing can proceed to Step S117 without proceeding to Step S116 when the target image 43 is framed within a fixed time (e.g., about one second). The message 45 may have any contents so long as the contents can tell a user that the target image 43 is framed out.

When the target image 43 is not framed out (Step S115: NO), whether the travel distance of the target image 43 is equal to or higher than a fixed value or not is determined (Step S117). When the travel distance of the target image 43 is equal to or higher than a fixed value (Step S117: YES), whether the center vector≈(nearly equal) the four surrounding vectors is established or not is determined (Step S118). In other words, since Step S110 described above has provided the center vector as a motion vector calculated based on the center detection region 51 and the for surrounding vectors respectively calculated based on the surrounding detection regions 52 to 55, these vectors are used to determine whether the center vector≈the four surrounding vectors is established or not.

When the center vector and the four surrounding vectors are matched or approximate to one another (Step S118: YES) (i.e., when all of the four surrounding vectors are matched or approximate to one another and all of the matched or approximate four surrounding vectors and center vector are matched or approximate to one another), it can be determined that the center vector and the four surrounding vectors are all motion vectors of the target image 43 as a single subject. When the center vector and the four surrounding vectors are all motion vectors of the target image 43 as a single subject, the target image 43 has a size at least reaching the four corners of the trimming frame 44. Thus, it can be assumed that the target image 43 may be larger than the trimming frame 44 with a high probability.

Figure 4G:
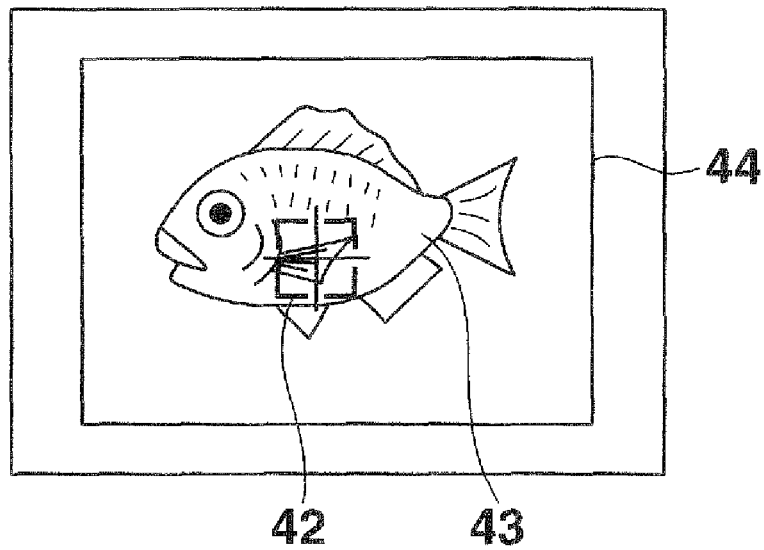
FIGS. 4G and 4H illustrate a display transition after the display transition of the embodiment of FIGS. 3A to 3F.

Thus, in this case, Step S118 determines YES and determines that the trimming frame 44 should be enlarged. Then, it is determined whether the trimming frame 44 exceeds the frame (the screen of the liquid crystal monitor 23) when the size of the trimming frame 44 is enlarged by a predetermined amount or not (Step S119). When the trimming frame 44 does not exceed the trimming frame 44 enlarged by the predetermined amount (Step S119: NO), the display size of the trimming frame 44 is enlarged by the predetermined amount (Step S120) to repeat the processings after Step S106. Thus, whenever Step S117 determines YES after the repetition of the processings after Step S106, the processing of Step S118 is executed. When the target image 43 is enlarged as shown in FIG. 4G, the trimming frame 44 can be displayed in an enlarged size so as to accommodate the target image 43.

When the enlarged trimming frame 44 exceeds the frame (Step S119: YES), the enlarged size of the trimming frame 44 is limited to a size at which the trimming frame 44 is prevented from exceeding the frame to display the trimming frame 44 with the changed size (Step S121). Thus, the maximum size of the trimming frame 44 is limited by the frame size. Thus, when Step S125 cuts out the image region surrounded by the trimming frame 44 (which will be described later), the cutout processing can be prevented from being impossible.

Figure 4H:
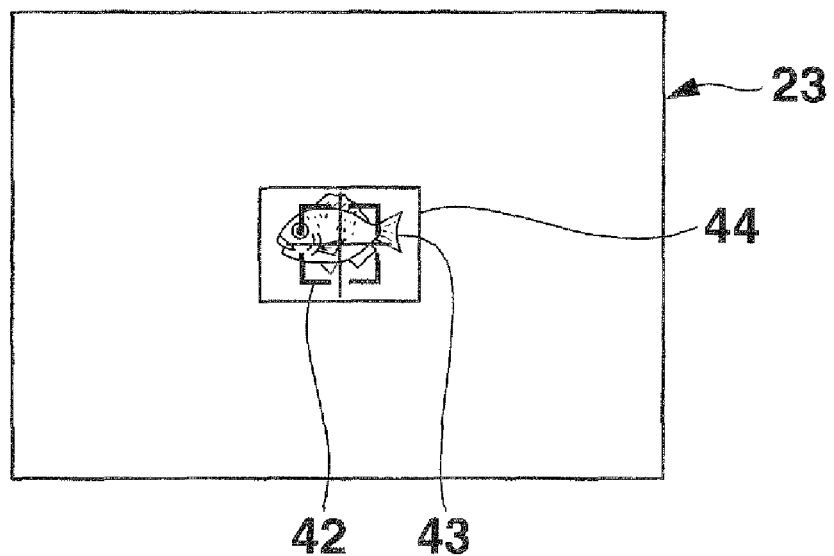

However, when the four surrounding vectors are all unmatched or not approximate to one another (Step S118: NO) and when the four surrounding vectors all matched or approximate to one another are unmatched with the center vector, it can be determined that the target image 43 has a size not reaching the four corners of the trimming frame 44 because the center vector is clearly the motion vector of the target image 43. Thus, Step S118 determines NO in this case to reduce the display size of the trimming frame 44 by the predetermined amount (Step S122) to repeat the processings after Step S106. In this manner, whenever Step S117 determines NO in the repetition of the processings after Step S106, the processing of Step S118 is executed. When the size of the target image 43 is reduced as shown in FIG. 4H, the trimming frame 44 is also displayed in a reduced size so as to accommodate the target image 43.

In this manner, the processings of Step S120 and Step S122 can always provide an optimal size to the trimming frame 44 in relation to the target image 43.

During the above processings, the trimming frame 44 continuously displayed can be visually recognized by the user so that the user can check whether the trimming frame 44 has an appropriate size or not to subsequently carry out a photographing operation (the shutter key full depression). When the user visually determines that the current size of the trimming frame 44 is different from the appropriate size, the user can operate the zoom key to finely adjust the size of the trimming frame 44 (Steps S107 and S108).

It is noted that Step S118 of this embodiment determines YES when the four surrounding vectors are all matched or approximate to one another and all of the four matched or approximate surrounding vectors are matched or approximate with the center vector and determines NO when cases other than the above case are found.

However, when the center of the trace frame 42 is not accurately matched with the center of the target image 43 (subject) (e.g., when the center is dislocated or when the target image 43 has a changed shape due to a change in the direction of the subject), one or some of the four surrounding vectors may not match with the center vector. To cope with this, when it is expected that the center may be dislocated or the subject may have a changed shape, YES may be determined when at least any one of the four surrounding vectors and the center vector are matched or approximate to one another and NO may be determined when any of the four surrounding vectors and the center vector are not matched or approximate to one another.

Alternatively, YES also may be determined when at least two of the four surrounding vectors and the center vector are matched or approximate to one another.

Alternatively, a different criterion also may be used depending on a level or a frequency of the dislocation of the center or the change in the shape of the subject.

The determination system as described above can enlarge the trimming frame 44 with a margin and can accommodate the target image 43 within the trimming frame 44 in a more secure manner.

When only one or some of the four surrounding vectors is/are matched with the center vector and the other surrounding vector(s) is/are not matched with the center vector, it also may be determined that the trace frame 42 is dislocated from the center of the target image 43 (subject) to finely adjust the position of the trimming frame 44 to the target image 43 (subject).

This fine adjustment also may be performed so as to move the trimming frame 44 by a predetermined amount from a direction along which the unmatched surrounding vector(s) exist(s) to a direction along which the matched surrounding vector(s) exist(s).

As a result, even when the center of the trace frame 42 is not accurately matched with the center of the subject when the user in Step S102 of FIG. 2 half-depresses the shutter, the centers of the former and the latter can be automatically matched.

It is noted that an operation mode in which the dislocation of the center position is automatically corrected also may be additionally used so that the automatic center matching as described above can be carried out only when this operation mode is set.

Then, when the user fully depresses the shutter, Step S106 determines YES. Thus, the AF processing is carried out and the lens block 11 is controlled so that the image region corresponding to the trace frame 42 is focused (Step S123). Then, the photographing processing is carried out (Step S124). Specifically, the CPU 13 is triggered by the full depression of the shutter key to instruct the CCD 18, the vertical/horizontal driver 19, the unit circuit 20, and the image processor 21 to switch from the through image photographing mode to the still image photographing mode. Then, the image data obtained through the photographing processing by this still image photographing mode is temporarily stored in the SDRAM 22.

Next, based on the image data temporarily stored in the SDRAM 22, the trimming processing is carried out to cut out the image region surrounded by the trimming frame 44 when the shutter key is fully-depressed (Step S125). Then, this cut image data is compressed to finally record the image data as a still image file having a predetermined format in the external memory 25 (Step S126).

As a result, an image in which the target image 43 as the desired subject is appropriately accommodated can be recorded as a still image file in the external memory even when a desired subject to be photographed is moved two-dimensionally (e.g., in an upper, lower, left or right direction) or three-dimensionally additionally in a front-and-rear direction.

Thus, this embodiment does not subject the target image 43 used in the second embodiment (which will be described later) to a contour extraction. Instead, this embodiment carries out the calculation of the center vector and the four surrounding vectors, which is a processing easier than this contour extraction, to detect the size of the target image 43. Thus, such a simple processing can be used to record the image in which the target image 43 as the desired subject is appropriately accommodated.

Since the calculation of the center vector in the target image 43 is also an existing technique used in the conventional technique according to which the motion of the target image 43 is followed by the trimming frame 44, a processing program realizing this existing technique can be directly used in the present invention. Thus, the direct use of the processing program realizing this existing technique can provide a simple processing that can be used to record the image in which the target image 43 as desired subject is appropriately accommodated.

It is noted that, although this embodiment has allowed Step S103 and Step S123 to carry out the AF processing, a continuous AF also may be started when the shutter key is half-depressed.

Figure 5B:
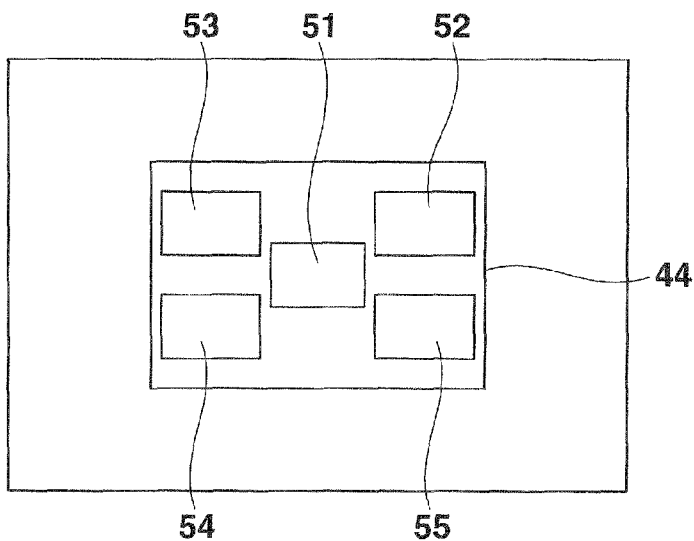
Figure 5C:
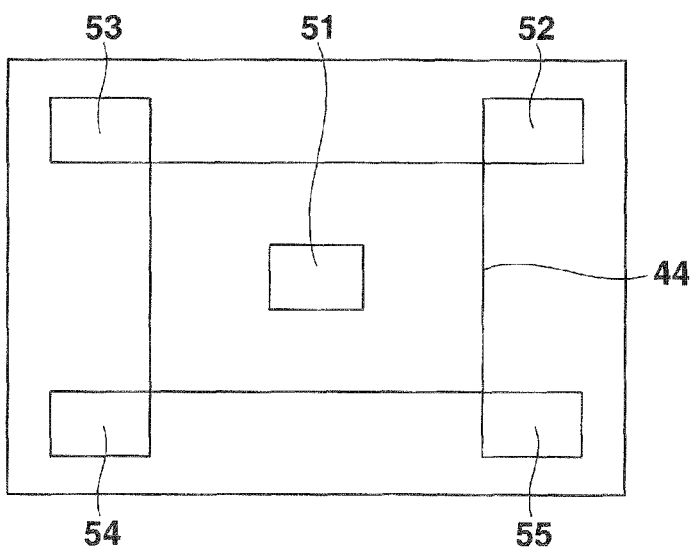

Although this embodiment has set the center detection region 51 at the center of the trimming frame 44 shown in FIG. 5A and has set the respective surrounding detection regions 52 to 55 at the inner side including the four corners of the trimming frame 44 to carry out the processing of Step S110, the center detection region 51 and the surrounding detection regions 52 to 55 also may be set as shown in FIGS. 5B and 5C.

When the size of the trimming frame 44 is changed, the positions of the surrounding detection regions 52 to 55 also can be simultaneously changed so as to maintain the positional relationship between the trimming frame 44 and the surrounding detection regions 52 to 55 in the respective settings.

In the case of FIG. 5B, the surrounding detection regions 52 to 55 are at the inner side of the trimming frame 44 and are provided to be closer to the center detection region 51. Thus, in the case of this example, the size of the trimming frame 44 can be controlled with a margin in relation in size with the target image 43. As a result, an image as a trimming image can be recorded with a margin so as to surround the target image 43.

In the case of FIG. 5C, the surrounding detection regions 52 to 55 are at the outer side of the trimming frame 44 on diagonal lines. Thus, in the case of this example, the size of the trimming frame can be controlled while suppressing an inconvenience where the trimming frame 44 is excessively large in relation in size with the target image 43. As a result, an image only composed of the target image 43 can be recorded as a trimming image.

It is noted that, although FIG. 5 has showed a case where the four surrounding detection regions were provided, the number of the surrounding detection regions is not limited to this. Specifically, the provision of one center detection region and at least one surrounding detection regions can be used to determine, when the target image 43 is moved, whether the target image 43 is larger or smaller in relation with the trimming frame 44 based on the center vector and the surrounding vector. The shapes of the center detection region 51 and the surrounding detection regions 52 to 55 are not limited to the rectangular ones and also may be any shape such as a circle or an ellipse.

Alternatively, a user also may switch and set any of the settings of FIGS. 5A, 5B, and 5C. Alternatively, a distance from the center detection region 51 to the surrounding detection regions 52 to 55 also may be changed in a non-step manner.

Although Step S117 of FIG. 2 has determined whether the travel distance of the target image 43 is equal to or higher than a fixed level or not, whether the subject corresponding to the target image 43 is moved relative to the background the target image 43 or not also may be more accurately determined by determining whether a difference between the travel distance of the target image 43 and the travel distance of the background is equal to or higher than a fixed difference or not.

Although this embodiment has changed the size of the trimming frame by the operation of the zoom key, the zoom key also may be operated to change the magnifying power of an optical zoom.

Although Steps S107 and S108 of FIG. 2 have finely-adjusted the size of the trimming frame 44 in accordance with the operation by a user, the fine adjustment also may be carried out so as to provide, in accordance with the user operation, the matching between the center of the trimming frame 44 and the center of the target image 43 (subject).

Second Embodiment

Figure 6:
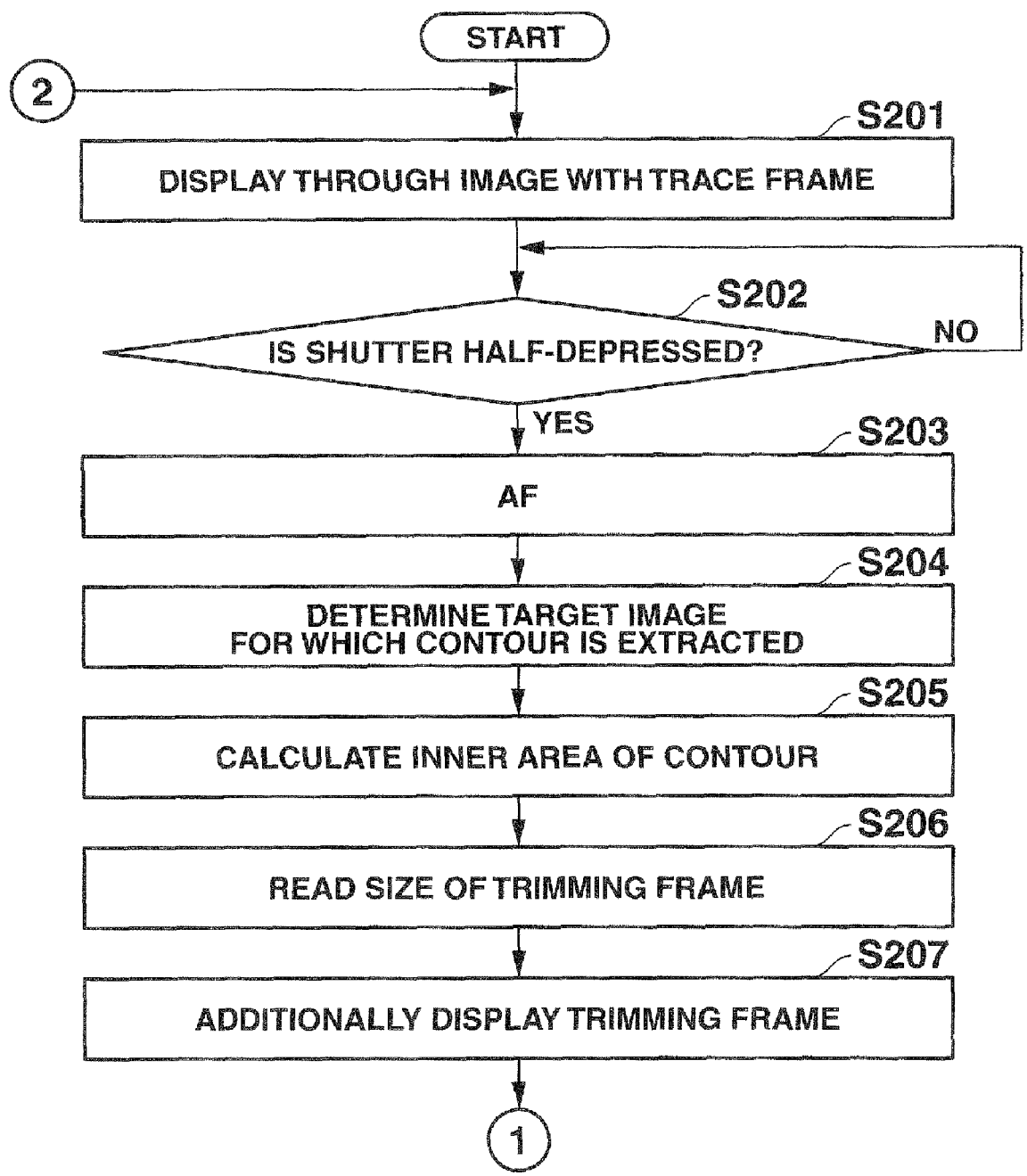
FIG. 6 is a flowchart illustrating a part of a processing procedure of the second embodiment.
Figure 7:
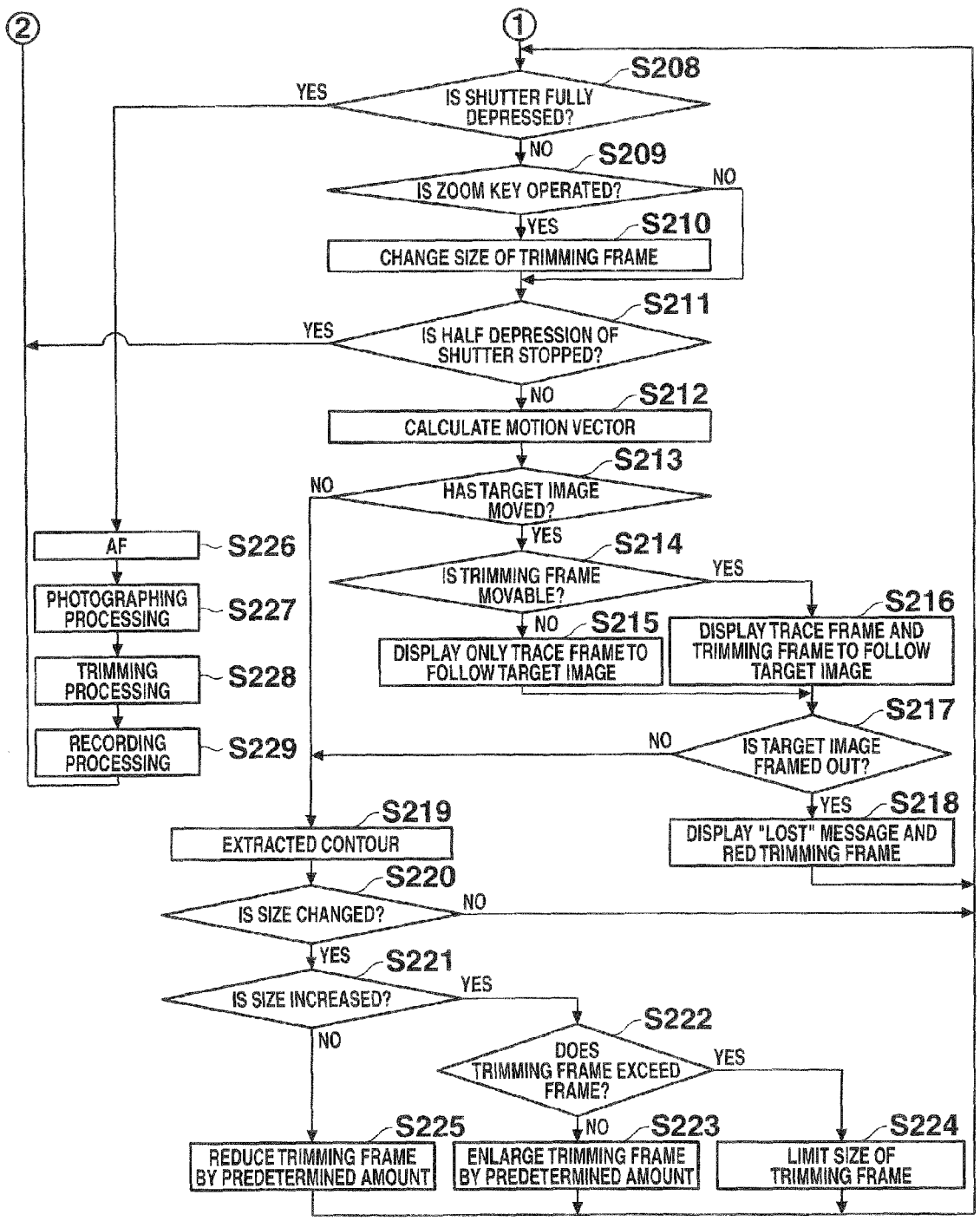
FIG. 7 is a flowchart after the processing of FIG. 6.

FIG. 6 and FIG. 7 are flowcharts illustrating a processing procedure in the second embodiment of the present invention. When the user operates the mode selection key to set the auto-framing mode, the CPU 13 executes the processings shown in the flowchart of FIG. 6 based on the program stored in the flash memory 26. First, the CPU 13 causes the liquid crystal monitor 23 to start the display of the through image with the trace frame (Step S201) with the trace frame 42 being displayed at the center.

Next, an operation for half-depressing the shutter key is waited (Step S202) during which the user adjusts the angle of the digital camera 10 so that the trace frame 42 is matched with a desired subject in the through image 41 to be photographed. When the trace frame 42 is matched with the desired subject, the user half-depresses the shutter key. As a result, Step S202 determines YES to proceed to Step S203 to carry out the AF processing to control the lens block 11 so that the image region corresponding to the trace frame 42 is focused (Step S203).

When the shutter key is half-depressed, the contour of the subject on which the trace frame 42 is superposed is extracted and the subject for which the contour is extracted is determined as the target image 43 (Step S204).

Next, an area in the contour extracted in the Step S204 is calculated (Step S205). Based on the calculated area in the contour, the size of the trimming frame 44 is read out from a flash memory 26 (Step S206). Specifically, in this embodiment, the flash memory 26 stores therein a table in which different sizes of the trimming frame 44 corresponding to different areas is stored. Thus, Step S206 reads from the table the size of the trimming frame 44 corresponding to the area calculated in Step S205. Then, the trimming frame 44 having a size adjusted based on the read size is additionally displayed (Step S207).

As a result, the trimming frame 44 having an appropriate size in accordance with the contour extracted in Step S204 can be displayed accurately.

It is noted that, although this embodiment has read the size of the trimming frame 44 corresponding to the inner area of the contour of the target image 43 to display the trimming frame 44 depending on the read size, instead of storing size of the trimming frame 44, the size of the trimming frame 44 also may be calculated based on the inner area of the contour of the target image 43 to display the trimming frame 44 having the calculated size.

Although this embodiment has displayed the trimming frame 44 having the size depending on the inner area of the contour of the target image 43, the trimming frame 44 also may be displayed with a size that merely accommodates the entirety of the extracted contour of the target image 43. This also allows the trimming frame 44 having an appropriate size to be displayed accurately in accordance with the contour extracted in Step S204.

Next, whether the shutter key is fully-depressed or not is determined (FIG. 7; Step S208). When the shutter key is not fully-depressed, whether the zoom key is operated or not is determined (Step S209). When the zoom key is operated, the trimming frame 44 is enlarged or reduced in accordance with the direction along which the zoom key is operated to display the frame size having the changed size (Step S210). Next, whether the half depression of the shutter key is stopped or not is determined (Step S211). When the half depression of the shutter key is stopped, the processing returns to Step S201.

When the shutter key is still half-depressed, the motion vector of the target image 43 is calculated (Step S212). Specifically, as in the case where the center vector Step S110 is calculated in the first embodiment, a block composed of a plurality of pixel for example is targeted in the center detection region 51 to calculate the motion vector of the targeted block. Then, based on the calculated motion vector, whether the target image 43 is moved in the through image or not is determined (Step S213). When the target image 43 is not moved in the through image, the processing proceeds to Step S219 (which will be described later).

When the target image 43 is moved in the through image, whether the trimming frame 44 can be moved to follow the target image 43 or not is determined (Step S214). Specifically, as shown in FIG. 3D, when the trimming frame 44 has already moved to an end of the screen of the liquid crystal monitor 23, it is determined that the trimming frame 44 cannot be further moved to the left. In this case, the target image 43 is not followed by the trimming frame 44 and is followed only by the trace frame 42 and the target image 43 is displayed in a displaced manner (Step S215).

When Step S214 determines YES and the trimming frame 44 can be moved to follow the target image 43, the target image 43 is followed by the trace frame 42 and the trimming frame 44 and is displayed in a displaced manner (Step S216). Thus, when the target image 43 is moved obliquely in the left lower direction as shown in FIG. 3E, the trace frame 42 superposed on the target image 43 and the trimming frame 44 in which the trace frame 42 is positioned at the center are displayed while being displaced by the same travel distance in the same direction.

Next, whether the target image 43 is framed out or not is determined (Step S217). Then, when the target image 43 is moved out of the screen of the liquid crystal monitor 23 and is framed out as shown in FIG. 3F (Step S217: YES), the message 45 of "subject lost" is displayed and the trimming frame 44 is displayed in red for example to change the display configuration of the trimming frame 44 (Step S218).

In this embodiment, the case where the target image 43 is framed out section to include a case where even a part of the target image 43 is framed out.

Thus, when the target image 43 is not framed out (Step S217: NO), this section that the entirety of the target image 43 exists on the screen. In this case, the contour of the target image 43 is extracted (Step S219). When the processing of Step S219 is the first one, the area in the area extracted in the Step S204 is compared with the area in the presently-extracted contour. When the processing of Step S219 is the one after the second one, the area of the contour extracted in Step S219 is compared with the area in the contour presently-extracted in Step S219 to determine whether or not the size of the target image 43 is changed in an amount equal to or higher than a predetermined amount (Step S220). When the size of the target image 43 is not changed in an amount equal to or higher than a predetermined amount (Step S220: NO), the processing returns to Step S208.

When the size of the target image 43 is changed in an amount equal to or higher than a predetermined amount (Step S220: YES), whether or not the area in the contour is increased with a ratio equal to or higher than a predetermined ratio or with an area equal to or higher than a predetermined area is determined (Step S221). When the area in the contour is increased with a ratio equal to or higher than a predetermined ratio or with an area equal to or higher than a predetermined area (Step S221: YES), the trimming frame 44 is proportionally enlarged. In order to proportionally enlarge the trimming frame 44, it is firstly determined whether the trimming frame 44 exceeds the frame or not when the size of the trimming frame 44 is increased by the predetermined amount (Step S222). When the trimming frame 44 exceeds the frame even when the trimming frame 44 is increased by the predetermined amount (Step S222: NO), the display size of the trimming frame 44 is increased by the predetermined amount (Step S223). Then, the processings after Step S208 are repeated. Thus, whenever Step S222 determines NO in the repetition of the processings after Step S208, the processing of Step S223 is carried out. When the target image 43 is enlarged as shown in FIG. 4G, the trimming frame 44 also can be displayed in an enlarged manner so as to accommodate the target image 43.

When the enlarged trimming frame 44 exceeds the frame (Step S222: YES), the size of the trimming frame 44 is limited to a level at which the trimming frame 44 is prevented from exceeding the frame and the trimming frame 44 is displayed with the changed size (Step S224). Thus, the maximum size of the trimming frame 44 is limited by the frame size, thus, when Step S228 cuts out the image region surrounded by the trimming frame 44 (which will be described later), the cutout processing can be prevented from being impossible.

When Step S221 determines NO and the area in the contour (the target image 43) is reduced with a ratio equal to or higher than a predetermined ratio or an area equal to or higher than a predetermined area, the size of the trimming frame 44 is reduced by a predetermined amount (Step S225) to repeat the processings after Step S208 are repeated. Thus, whenever Step S221 determines NO in the repetition of the processings after Step S208, the processing of Step S225 is carried out. When the target image 43 is reduced as shown in FIG. 4H, the trimming frame 44 is also displayed in a reduced manner so as to accommodate the target image 43.

Thus, the processings of Step S223 and Step S225 can always control the trimming frame 44 to have an appropriate size in relation with the target image 43.

During the above processings, the user can visually check the continuously-displayed trimming frame 44 to determine whether the trimming frame 44 has an appropriate size or not to subsequently carry out a photographing operation (the shutter key full depression).

Then, when the user fully depresses the shutter key, Step S208 determines YES. Thus, the AF processing is carried out to control the lens block 11 so that the image region corresponding to the trace frame 42 is focused (Step S226) and the photographing processing is carried out (Step S227). This photographing processing cuts out, from the image data temporarily stored in the SDRAM 22, the image region that is surrounded by the trimming frame 44 at the point of the full depression of the shutter key (Step S228). Then, the cut image data is compressed and is finally recorded in the external memory 25 as a still image file having a predetermined format (Step S229).

As described above, this embodiment can extract the contour of the target image 43 to control the size of the trimming frame 44 in accordance with the change of this extracted contour. Thus, the trimming frame 44 can be accurately controlled to have an appropriate size in relation with the size of the target image 43. As a result, the image cut out in Step S228 can be recorded to accommodate the target image 43 having the appropriate size.

It is noted, although this embodiment has extracted the contour of the target image 43 to carry out the size determination in Steps S220 and S221 based on the extracted area in the contour to allow Steps S223 and S225 to change the size of the trimming frame 44 by a predetermined amount, the size determination of Steps S220 and S221 also may be carried out based on a length in the contour (e.g., a longitudinal dimension or a lateral dimension of the extracted contour) to allow Steps S223 and S225 to change the size of the trimming frame 44 so as to accommodate the entire image within the contour.

Third Embodiment

Figure 8:
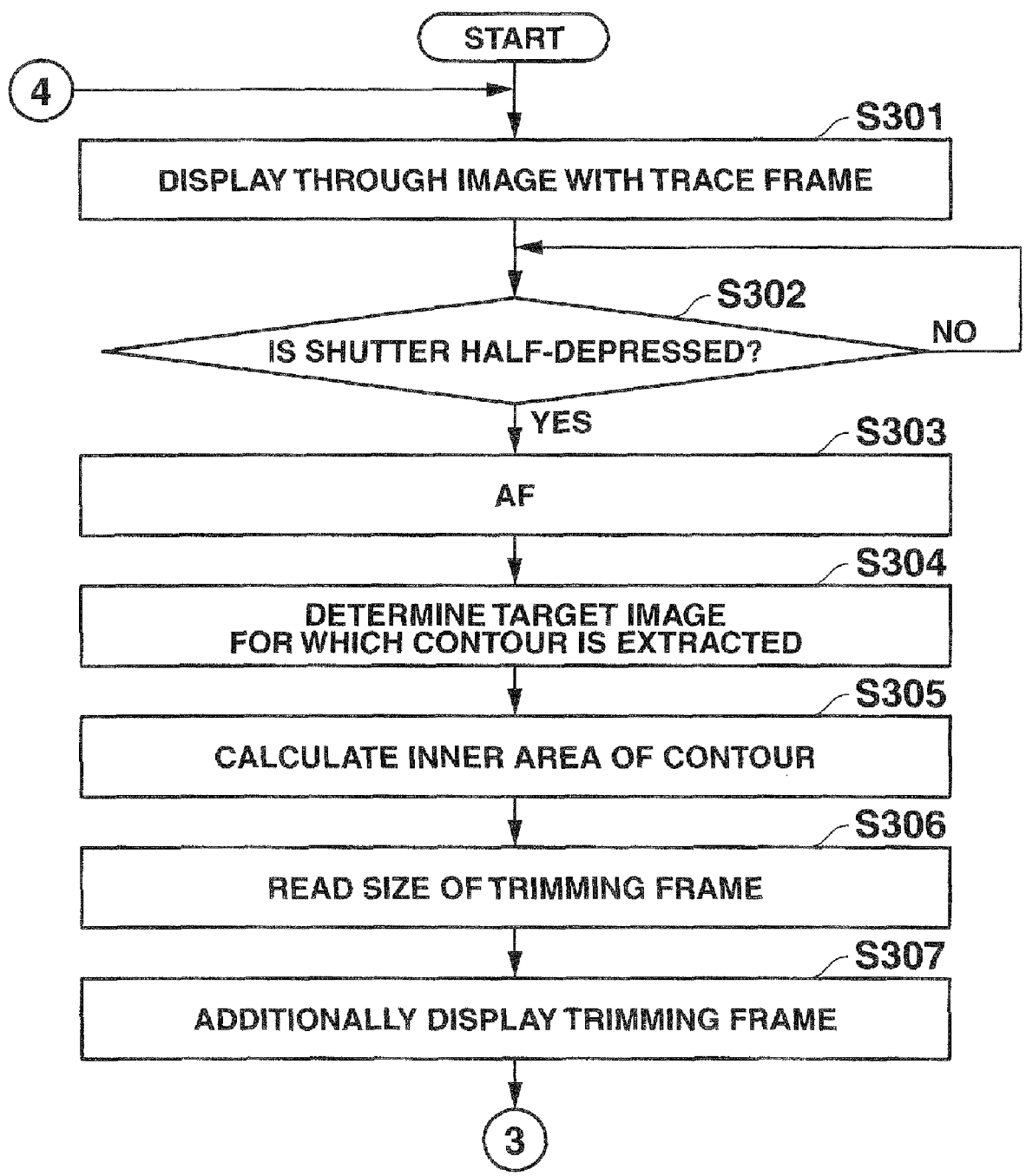
FIG. 8 is a flowchart illustrating a part of a processing procedure of the third embodiment.
Figure 9:
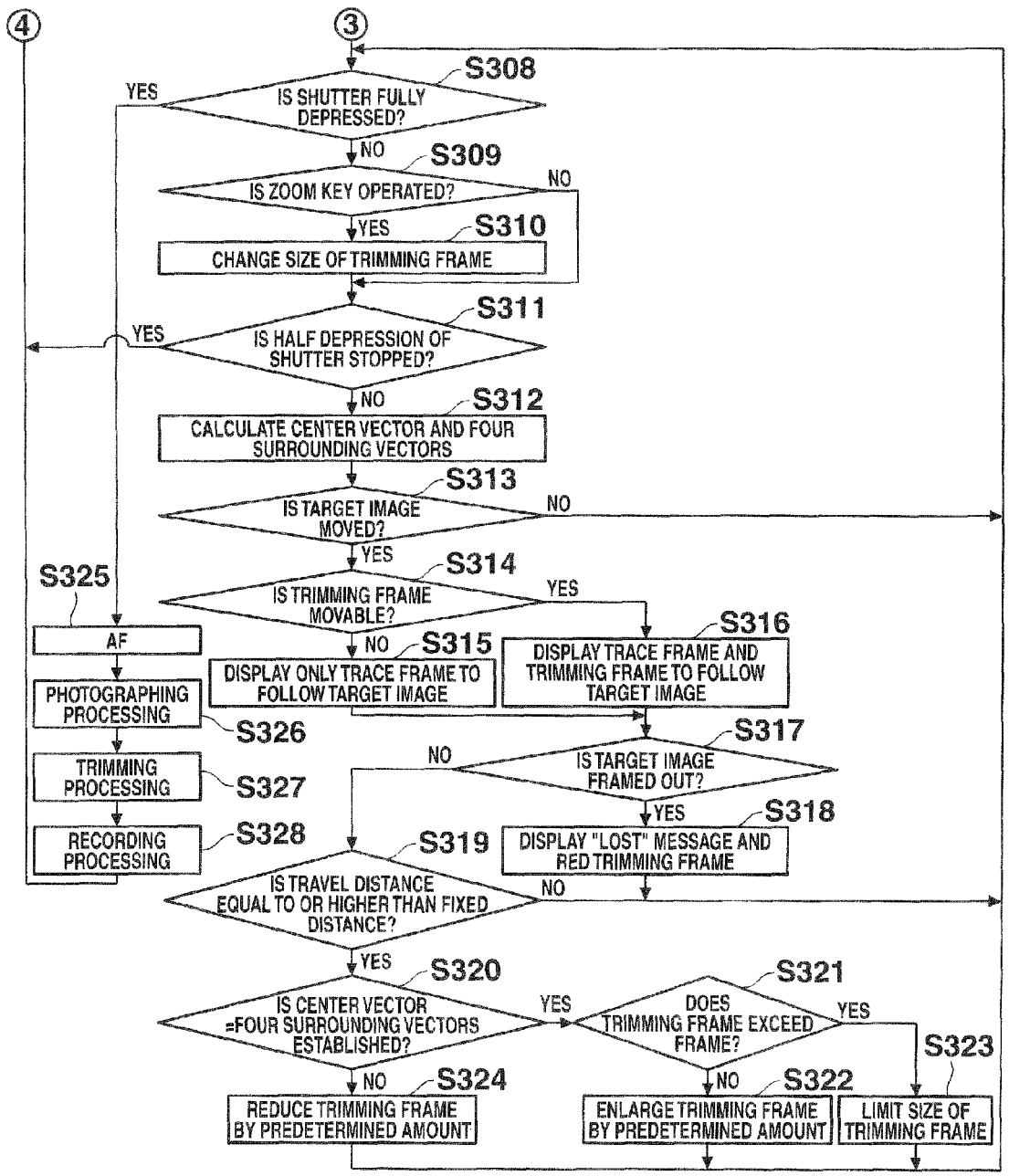
FIG. 9 is a flowchart after the processing of FIG. 8.

FIG. 8 and FIG. 9 are flowcharts illustrating a processing procedure in the third embodiment of the present invention. In this flowchart, Steps S301 to S307 are the same as Steps S201 to S207 in the second embodiment and Steps S308 to S328 are the same as Steps S106 to S126 in the first embodiment.

Specifically, the liquid crystal monitor 23 is caused to display the through image with the trace frame (Step S301) so that the trace frame 42 is displayed at the center. Next, the half depression operation of the shutter key is waited (Step S302). When the user half-depresses the shutter key, Step S302 determines YES to proceed to Step S303 to execute the AF processing to control the lens block 11 so that the image region corresponding to the trace frame 42 is focused (Step S303).

Then, the contour of the subject on which the trace frame 42 is superposed when the shutter key is half-depressed is extracted and this subject for which the contour is extracted is determined as the target image 43 (Step S304). Next, the area in the contour extracted in Step S304 is calculated (Step S305). Then, based on the calculated area in the contour, the size of the trimming frame 44 is read out from the flash memory 26 (Step S306). Based on the read size, the trimming frame 44 is additionally displayed (Step S307). It is noted that, as in the second embodiment, this embodiment also displays the trimming frame 44 only having a size accommodating the entire contour of extracted the target image 43.

It is determined whether the shutter key is fully-depressed or not (FIG. 9; Step S308). When the shutter key is not fully-depressed (Step S308: NO), whether the zoom key is operated or not is determined (Step S309). When the zoom key is operated, the trimming frame 44 is enlarged or reduced in accordance with the operation direction to display the trimming frame 44 with the changed frame size (Step S310). Next, whether the half depression of the shutter key is stopped or not is determined (Step S311). When the half depression of the shutter key is stopped (Step S311: YES), the processing returns to Step S301.

When the shutter key is still half-depressed (Step S311: NO), the center vector and the four surrounding vectors are calculated (Step S312). Then, based on the calculated center vector, whether the target image 43 is moved within the through image or not is determined (Step S313). When the target image 43 is moved within the through image (Step S313: YES), whether the trimming frame 44 can be moved to follow the target image 43 or not is determined (Step S314). When the trimming frame 44 cannot be moved to follow the target image 43 (Step S314: NO), the trimming frame 44 is not displayed to follow the target image 43 and only the trace frame 42 is displayed to follow the target image 43 in a displaced manner (Step S315).

When the trimming frame 44 can be moved to follow the target image 43 (Step S314: YES), the trace frame 42 and the trimming frame 44 are displayed to follow the target image 43 in a displaced manner (Step S316). Next, whether the target image 43 is framed out or not is determined (Step S317). When the target image 43 is framed out (Step S317: YES), the message 45 of "subject lost" is displayed and the trimming frame 44 is displayed in red, thereby changing the display configuration of the trimming frame 44 (Step S318).

When the target image 43 is not framed out (Step S317: NO), whether the travel distance of the target image 43 is equal to or longer than a fixed distance or not is determined (Step S319). When the travel distance of the target image 43 is equal to or longer than the fixed distance (Step S319: YES), whether the center vector≈the four surrounding vectors is established or not is determined (Step S320). When Step S320 determines YES, whether the trimming frame 44 exceeds the frame when the size of the trimming frame 44 is increased by a predetermined amount or not is determined (Step S321). When the trimming frame 44 having a size increased by the predetermined amount does not exceed the frame (Step S321: NO), the display size of the trimming frame 44 is increased by the predetermined amount (Step S322) to repeat the processings after Step S308.

When the trimming frame 44 having the increased size exceeds the frame (Step S321: YES), the size of the trimming frame 44 is limited to a size at which the trimming frame 44 does not exceed the frame to display the trimming frame 44 in the changed size (Step S323). When Step S320 determines NO, the size of the trimming frame 44 is reduced by a predetermined amount (Step S324) to repeat the processings after Step S308.

Then, when the user fully depresses the shutter key, Step S308 determines YES. As a result, the processings of Steps S325 to S328 are executed to record the image of the image region surrounded by the trimming frame 44 when the shutter key is fully depressed as a still image file having a predetermined format in the external memory 25.

As described above, according to the third embodiment, immediately after the half depression of the shutter key at which a to-be-photographed subject has a relatively small motion, the contour extraction processing is executed that can, although requiring a processing time, accurately detect the outer shape of the target image 43 (Step S304). Based on this extracted contour, the trimming frame 44 is additionally displayed (Step S307). Thus, immediately after the half depression of the shutter key, the trimming frame 44 having an appropriate size relative to the size of the target image 43 can be accurately displayed.

It is expected that a to-be-photographed subject has an increasing motion as time passes since the half depression of the shutter key. Thus, as in the second embodiment the contour extraction processing (Step S219) is carried out thereafter to control the size of the trimming frame 44 based on this extracted contour (Steps S223 and S225). This causes a risk where a processing speed slower than the motion of the target image 43 may be caused to prevent the trimming frame 44 having an appropriate size from being displayed.

However, in this embodiment, the detection of the motion of the target image 43 in the front-and-rear direction and the control of the size of the trimming frame 44 are simply carried out, as in the first embodiment, based on the center detection region 51 set at the center of the trimming frame 44 show in FIG. 5 and based on the motion vectors detected in the surrounding detection regions 52 to 55 respectively set at the inner side of the four corners (Steps S312 and S319 to S324). Thus, the size of the trimming frame 44 can be controlled with a higher processing speed when compared with the second embodiment in which a complicated processing is required to detect the contour to control the motion of the target image 43 in the front-and-rear direction and the size of the trimming frame 44. This can prevent an inconvenience where the processing speed is slower than the motion of the target image 43 and can provide the control for displaying the trimming frame 44 having an appropriate size.

In other words, according to this embodiment, immediately after the shutter key is half-depressed, the contour extraction can be used to accurately display the trimming frame 44 having an appropriate size. Thereafter, a simple size detection processing can be used to change and control the display size of the trimming frame 44 without delay and on a timely basis.

Fourth Embodiment

Figure 10:
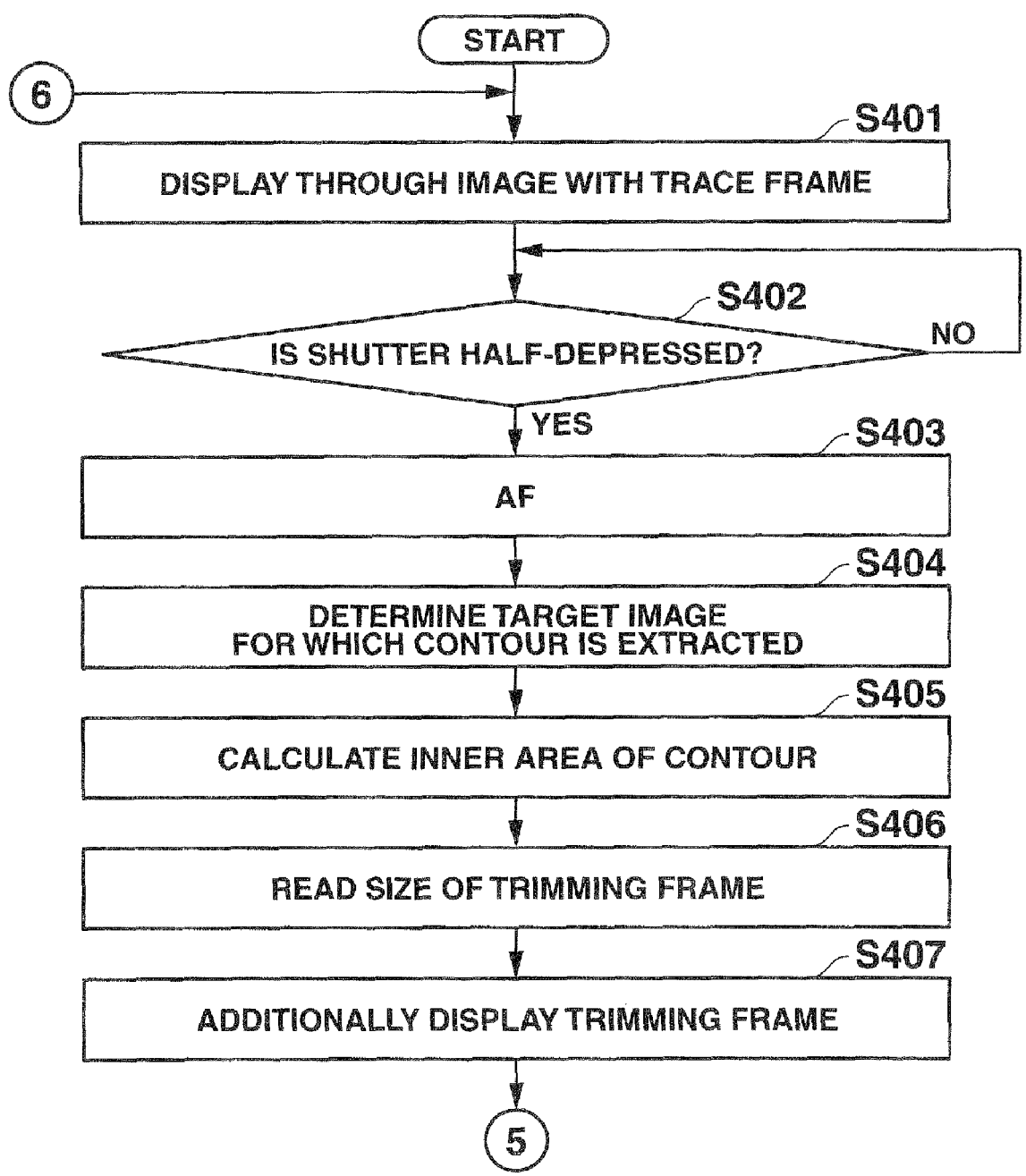
FIG. 10 is a flowchart illustrating a part of a processing procedure of the fourth embodiment.
Figure 11:
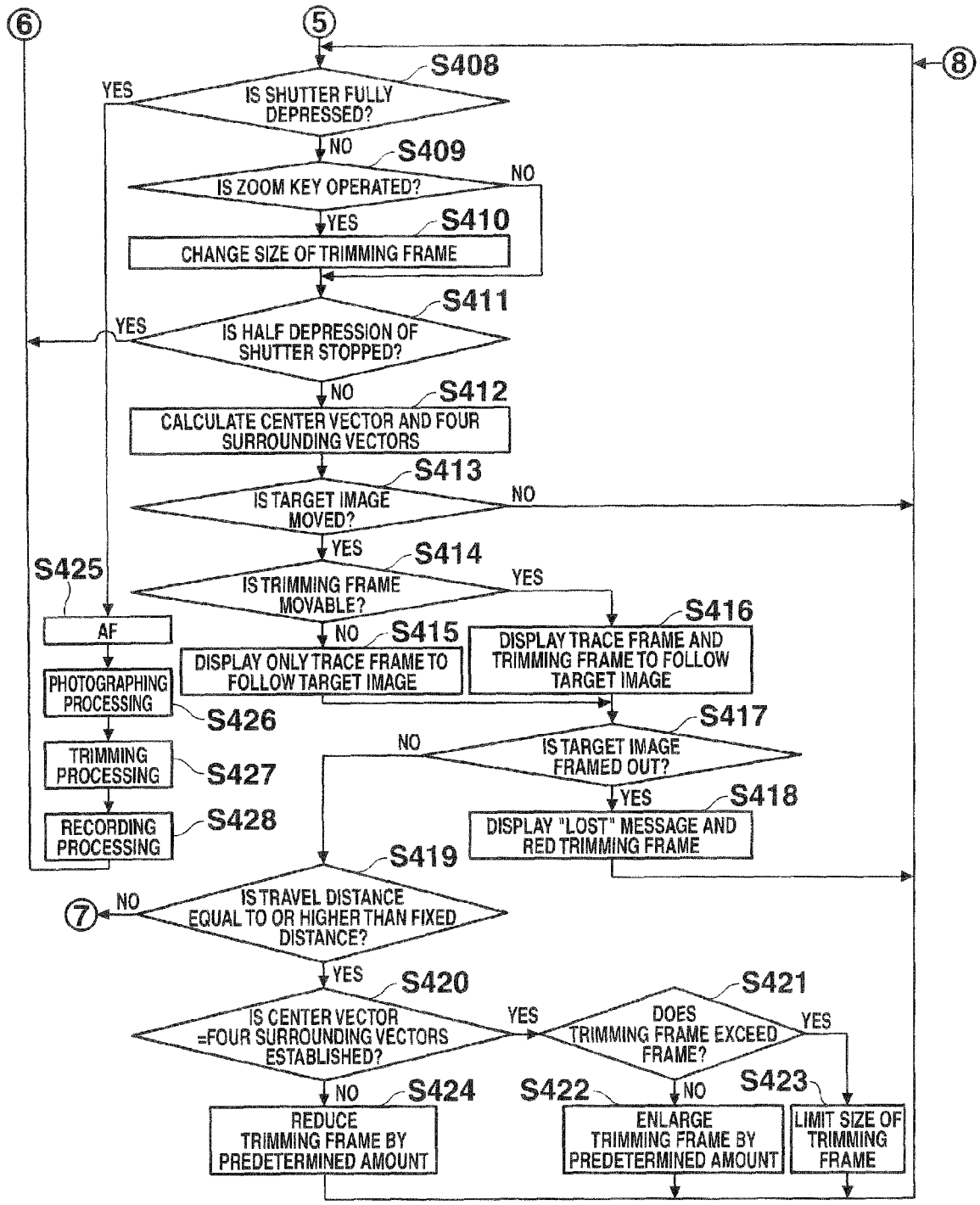
FIG. 11 is a flowchart after the processing of FIG. 10.
Figure 12:
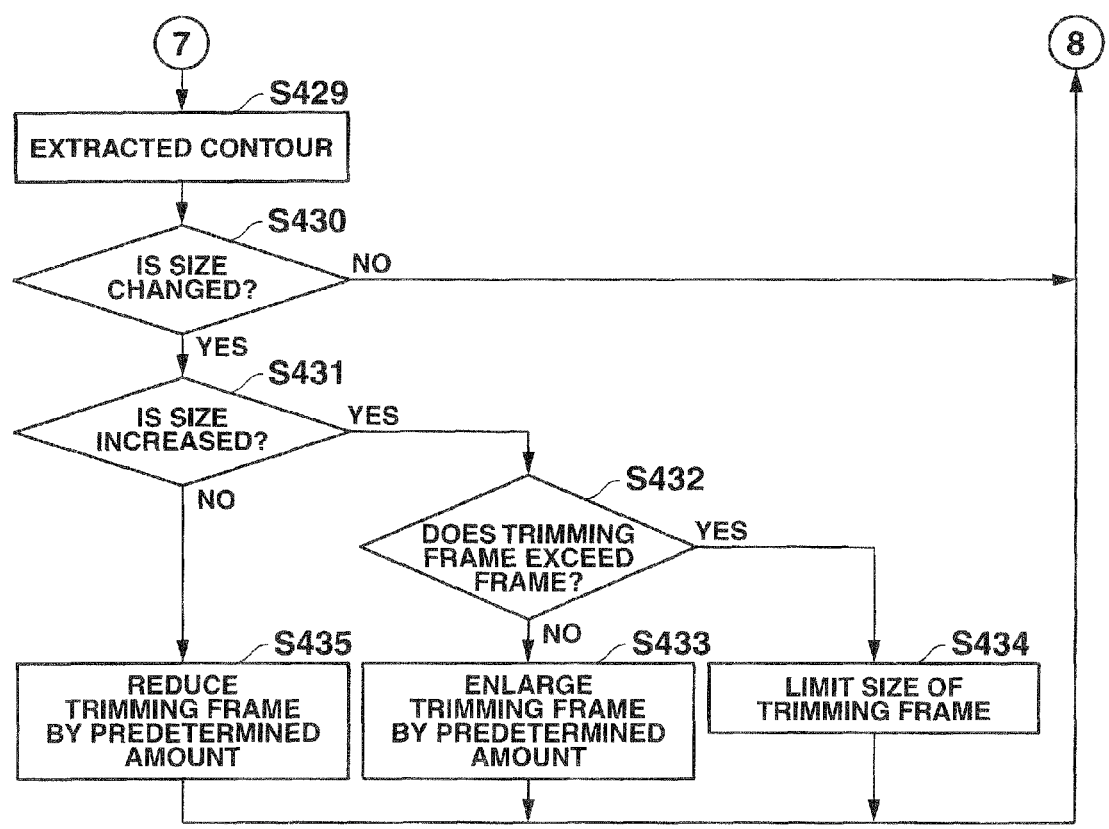
FIG. 12 is a flowchart after the processing of FIG. 1.

FIG. 10 to FIG. 12 are flowcharts illustrating a processing procedure in the fourth embodiment of the present invention. In these flowcharts, Steps S401 to S428 are all the same as Steps S301 to S328 in the third embodiment. Thus, as in the above-described third embodiment, this embodiment can use, immediately after the half-depression of the shutter key, the contour extraction to accurately display the trimming frame 44 having an appropriate size to subsequently use the simple size detection processing to change and control the display size of the trimming frame 44 without delay and on a timely basis.

This embodiment is also different from the third embodiment in that the determination of Step S419 in FIG. 11 of NO and the target image 43 having a travel distance smaller than a fixed distance causes the processing to proceed from Step S419 to Step S429 in FIG. 12. Then, in Steps S429 to Step S435, the same processings as those of Steps S219 to S225 of the second embodiment are carried out.

In other words, in this embodiment, when the travel distance of the target image 43 is equal to or larger than a fixed distance, this embodiment simply carries out, as in the first embodiment, the detection of the motion of the target image 43 in the front-and-rear direction and the control of the size of the trimming frame 44 (motion vector method) based on the center detection region 51 set at the center of the trimming frame 44 and the motion vectors detected in the surrounding detection regions 52 to 55 set at the inner side of the four corners shown in FIG. 5. However, when the travel distance of the target image 43 is smaller than the fixed distance, the contour extraction processing is carried out as in the first embodiment to carry out, based on the extracted contour, the detection of the motion of the target image 43 in the front-and-rear direction and the control of the size of the trimming frame 44 (contour extraction method).

As described above, the detection of the motion of the target image 43 in the front-and-rear direction and the control of the size of the trimming frame 44 (contour extraction method) based on the center detection region 51 and the motion vectors detected in the surrounding detection regions 52 to 55 shown in FIG. 5 cannot be carried out without the detection of the motion vector. Thus, this contour extraction method cannot be carried out without the movement of a subject as the target image 43. Specifically, when a clear movement of a subject as the target image 43 is available, the processings of Steps S420 to S424 can be used to change and control the display size of the trimming frame 44 appropriately and on a timely basis. In addition, since this processing is simpler than the contour extraction as described above, no problem is caused in the processing speed even when the travel distance of the target image 43 is equal to or longer than a fixed distance.

On the other hand, the detection of the motion of the target image 43 in the front-and-rear direction and the control of the size of the trimming frame 44 based on an extracted contour (motion vector method) can be carried out without the movement of a subject as the target image 43. Thus, even when the travel distance of the target image 43 is smaller than the fixed distance, the processings of Steps S429 to S435 can be used to smoothly carry out the contour extraction processing to execute, based on the extracted contour, the detection of the motion of the target image 43 in the front-and-rear direction and the control of the size of the trimming frame 44. Although the contour extraction method requires a longer processing time than the motion vector method as described above, no problem is caused in the processing speed so long as the travel distance of the target image 43 is smaller than the fixed distance.

Thus, according to this embodiment, an appropriate method suitable for the travel distance of the target image 43 can be used to carry out the detection of the motion of the target image 43 in the front-and-rear direction and the control of the size of the trimming frame 44.

It is noted that, although the respective embodiments have displayed the trimming frame 44, an image in the trimming frame 44 also may be displayed on the entire screen of the liquid crystal monitor 23 without displaying the image on the trimming frame 44. Although the respective embodiments have carried out only the control of the size of the trimming frame 44, another configuration also may be used to carry out not only the control of the size of the trimming frame 44 but also the display of the target image 43 with different colors depending on a case where the trimming frame 44 is enlarged (i.e., when the subject approaches) and a case where the trimming frame 44 is reduced (i.e., when the subject goes away).

Although the respective embodiments have changed the position and the size of the trimming frame showing the image-capture range, another configuration also may be used that changes the position and the size of an AE measurement frame showing a range in which the brightness of a subject based on AE is measured or an AF measurement frame showing a range in which the brightness of a subject based on AF is measured.

The present invention can be used for a camera apparatus that can record, even when a desired subject moves in the front-and-rear direction, the image of the subject in which the subject is appropriately accommodated.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-56682 filed on Mar. 7, 2007. The entirety of the specification, claims, and drawings of Japanese Patent Application No. 2007-56682 is herein incorporated by reference.

What is claimed is:

1. A camera apparatus comprising:
   an imaging section which sequentially images a subject image;
   a setting section which sets a frame that surrounds a target image in the subject image imaged by the imaging section;
   a calculation section which calculates a motion vector of the image in a center portion of a region in the frame set by the setting section, and a motion vector of the image in a predetermined portion of the subject image away from the center portion by a predetermined distance corresponding to a size of the frame;
   a first control section which controls the frame to be displaced by an amount corresponding to the motion vector in the center portion calculated by the calculation section; and
   a second control section which reduces the size of the frame when the motion vector in the center portion and the motion vector in the predetermined portion calculated by the calculation section are not consistent with each other or are not approximate to each other.

2. The camera apparatus according to claim 1, further comprising:
   a display section; and
   a display control section which controls the display to display the image in the frame.

3. The camera apparatus according to claim 2, wherein the display control section controls the display section to display the subject image imaged by the imaging section so that the frame is displayed on the subject image, and changes a display position and a display size of the frame in accordance with the displacement by the first control section and the reduction in the size by the second control section.

4. The camera apparatus according to claim 1, wherein:
the imaging section sequentially images the subject image to output the subject image for each screen frame; and
the second control section variably controls the size of the frame while limiting the size to a range within which the frame can be accommodated in the screen frame.

5. The camera apparatus according to claim 1, wherein:
the camera apparatus includes a recording section which records an image;
the frame comprises a trimming frame; and
the recording section records the image within the trimming frame.

6. The camera apparatus according to claim 1, wherein the second control section enlarges the size of the frame when the motion vector in the center portion and the motion vector in the predetermined portion calculated by the calculation section are consistent with each other or are approximate to each other.

7. The camera apparatus according to claim 1, wherein the frame comprises one of a trimming frame defining a region down to which an image is trimmed, an AE measuring frame indicating a range wherein a brightness of the subject image is measured, and an AF measuring frame indicating a range wherein a contrast is measured by auto focusing.

8. A camera apparatus comprising:
an imaging section which sequentially images a subject image;
a setting section which sets a frame that surrounds a target image in the subject image imaged by the imaging section;
a calculation section which calculates a motion vector of the image in a center portion of a region in the frame set by the setting section, and motion vectors of the image in a plurality of predetermined portions of the subject image each located apart from the center portion by a predetermined distance corresponding to a size of the frame;
a first control section which controls the frame to be displaced by an amount corresponding to the motion vector in the center portion calculated by the calculation section; and
a second control section which reduces the size of the frame when the motion vector in the center portion and the motion vector in the predetermined portion calculated by the calculation section are not consistent with each other or are not approximate to each other.

9. The camera apparatus according to claim 8, wherein:
the frame has a rectangular shape; and
the plurality of predetermined portions comprise four corner portions of the frame.

10. The camera apparatus according to claim 8, wherein the second control section enlarges the size of the frame when the motion vector in the center portion calculated by the calculation section and all of the motion vectors in the plurality of predetermined portions calculated by the calculation section are consistent with each other or are approximate to each other.

11. The camera apparatus according to claim 8, wherein the second control section reduces the size of the frame when the motion vector in the center portion calculated by the calculation section and any one of the motion vectors in the plurality of predetermined portions calculated by the calculation section are not consistent with each other or are not approximate to each other.

12. The camera apparatus according to claim 8, wherein the second control section adjusts the position of the center portion of the frame when (i) the motion vector in the center portion calculated by the calculation section and a part of the motion vectors in the plurality of predetermined positions calculated by the calculation section are consistent with each other or are approximate to each other, and (ii) the motion vector in the center portion calculated by the calculation section and others of the motion vectors besides the part in the plurality of predetermined positions calculated by the calculation section are not consistent with each other or are not approximate to each other.

13. A non-transitory computer-readable storage medium having a program stored thereon which controls a camera apparatus including an imaging section which sequentially images a subject image to function as:
a setting section which sets a frame that surrounds a target image in the subject image imaged by the imaging section;
a calculation section which calculates a motion vector of the image in a center portion of a region in the frame set by the setting section, and a motion vector of the image in a predetermined portion of the subject image away from the center portion by a predetermined distance corresponding to a size of the frame;
a first control section which controls the frame to be displaced by an amount corresponding to the motion vector in the center portion calculated by the calculation section; and
a second control section which reduces the size of the frame when the motion vector in the center portion and the motion vector in the predetermined portion calculated by the calculation section are not consistent with each other or are not approximate to each other.

14. A method for controlling a camera apparatus, the method comprising:
sequentially imaging a subject image using an imaging device;
setting a frame that surrounds a target image in the subject image;
calculating a motion vector of the image in a center portion of a region in the set frame, and a motion vector of the image in a predetermined portion of the subject image away from the center portion by a predetermined distance corresponding to a size of the frame;
controlling the frame to be displaced by an amount corresponding to the calculated motion vector in the center portion; and
reducing the size of the frame when the calculated motion vector in the center portion and the calculated motion vector in the predetermined portion are not consistent with each other or are not approximate to each other.

* * * * *